(12) United States Patent
Herlem (10) Patent No.: US 10,953,934 B2
(45) Date of Patent: Mar. 23, 2021

(54) AERODYNAMIC DEFLECTOR DEVICE FOR MOTOR VEHICLE WHEEL

(71) Applicant: Valeo Systemes Thermiques, Le Mesnil-Saint-Denis (FR)

(72) Inventor: Jean-Paul Herlem, Le Mesnil Saint Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 8 days.

(21) Appl. No.: 16/469,347

(22) PCT Filed: Dec. 4, 2017

(86) PCT No.: PCT/FR2017/053375
§ 371 (c)(1),
(2) Date: Jun. 13, 2019

(87) PCT Pub. No.: WO2018/109311
PCT Pub. Date: Jun. 21, 2018

(65) Prior Publication Data
US 2020/0010128 A1    Jan. 9, 2020

(30) Foreign Application Priority Data

Dec. 13, 2016  (FR) ...................................... 1662345

(51) Int. Cl.
*B62D 35/00*   (2006.01)
*B62D 35/02*   (2006.01)

(52) U.S. Cl.
CPC ........... *B62D 35/005* (2013.01); *B62D 35/02* (2013.01)

(58) Field of Classification Search
CPC .............................. B62D 35/005; B62D 35/02
(Continued)

(56) References Cited

U.S. PATENT DOCUMENTS

| | | | | | |
|---|---|---|---|---|---|
| 4,159,140 A | * | 6/1979 | Chabot | ................ | B62D 35/005 296/180.5 |
| 4,659,130 A | * | 4/1987 | Dimora | ................ | B62D 35/005 296/180.1 |

(Continued)

FOREIGN PATENT DOCUMENTS

| | | |
|---|---|---|
| EP | 1040985 A1 | 10/2000 |
| FR | 2858793 A1 | 2/2005 |

(Continued)

OTHER PUBLICATIONS

International Search Report and Written Opinion issued in corresponding PCT Application No. PCT/FR2017/053375, dated Mar. 9, 2018 (18 Pages with English Translation of International Search Report and Written Opinion).

*Primary Examiner* — Gregory A Blankenship
(74) *Attorney, Agent, or Firm* — Osha Bergman Watanabe & Burton LLP (57) ABSTRACT

The invention relates to an aerodynamic deflector device for a motor vehicle wheel, comprising: a deflecting wall (5) mounted movable relative to a stationary frame (39) between a retracted position in which the deflecting wall (5) is raised and an extended position in which the deflecting wall (5) is lowered relative to the stationary frame (39). According to the invention, the deflecting device also includes a resiliently deformable resilient module (13), arranged so as to move the deflecting wall (5) towards the extended position when the deflecting wall is no longer in the extended position.

10 Claims, 4 Drawing Sheets

(58) Field of Classification Search
USPC .......................................... 296/180.1, 180.5
See application file for complete search history.

(56) References Cited

U.S. PATENT DOCUMENTS

| | | | | | |
|---|---|---|---|---|---|
| 4,951,994 | A * | 8/1990 | Miwa | ................... | B62D 35/005 |
| | | | | | 296/180.1 |
| 9,102,366 | B1 * | 8/2015 | Kim | ..................... | B62D 35/005 |
| 2004/0113457 | A1 * | 6/2004 | Jacquemard | ......... | B62D 35/005 |
| | | | | | 296/180.1 |
| 2004/0130182 | A1 * | 7/2004 | Bangle | .................... | D06N 3/14 |
| | | | | | 296/180.5 |
| 2007/0216194 | A1 * | 9/2007 | Rober | .................... | B62D 37/02 |
| | | | | | 296/180.1 |
| 2011/0049913 | A1 * | 3/2011 | Bernt | ..................... | B60R 19/48 |
| | | | | | 293/102 |
| 2011/0187151 | A1 * | 8/2011 | Mackenzie | ............ | B60R 19/40 |
| | | | | | 296/180.5 |
| 2014/0217776 | A1 * | 8/2014 | Senatro | ................ | B62D 35/001 |
| | | | | | 296/180.4 |
| 2017/0166267 | A1 * | 6/2017 | Ribaldone | .............. | B62D 37/02 |
| 2018/0162459 | A1 * | 6/2018 | Abdoul Azizou | ...... | H02P 6/182 |
| 2019/0039663 | A1 * | 2/2019 | Bray | ...................... | B62D 35/02 |
| 2019/0118874 | A1 * | 4/2019 | Ibanez Moreira | ..... | B62D 37/02 |
| 2019/0152543 | A1 * | 5/2019 | Shiga | ................... | B62D 35/005 |
| 2019/0233025 | A1 * | 8/2019 | Mitidieri | ................ | B62D 35/02 |
| 2019/0291783 | A1 * | 9/2019 | Nishida | ................. | B60G 7/001 |
| 2020/0010128 | A1 * | 1/2020 | Herlem | ................. | B62D 37/02 |
| 2020/0094889 | A1 * | 3/2020 | Shiga | ................... | B62D 35/005 |
| 2020/0156715 | A1 * | 5/2020 | Andre | ................... | B62D 35/02 |
| 2020/0164934 | A1 * | 5/2020 | Shiga | ................... | B62D 35/005 |

FOREIGN PATENT DOCUMENTS

FR            2927303 A1     8/2009
FR            2959195 A1     10/2011

* cited by examiner

AERODYNAMIC DEFLECTOR DEVICE FOR MOTOR VEHICLE WHEEL

The present invention relates to an aerodynamic deflector device for a motor vehicle wheel.

As part of reducing the fuel consumption, and as a result, reducing the emission of greenhouse gases ($CO_2$) or pollutants (NOx) by a vehicle, it is known to arrange an aerodynamic deflector in front of the wheels of the vehicle.

By controlling the flow of air over the wheels and wheel arches in the body, it is theoretically possible to reduce by up to 30% the vehicle's drag, represented by the factor $C_x$, known as the specific drag coefficient of the vehicle, in the calculation of the drag force or fluid friction force in air $F_x$, which is expressed as:

$$F_x = q \cdot S \cdot C_x$$

where q denotes the dynamic pressure ($q = \frac{1}{2} \rho V^2$ where $\rho$ is the air density, and V is the air speed relative to the vehicle), and S denotes the reference area of the vehicle.

Aerodynamic deflectors used to control the flow of air over the wheels generally take the form of either a flexible flap or a retractable plastic or metal deflector. Retractable deflectors generally take the form of a flat or curved surface, sloping towards the rear, of a comparable width to the wheel in front of which they are placed. They can be moved selectively between at least two positions, a retracted position in which a deflecting surface is contained in a recess, and an extended position in which the deflecting surface extends from the vehicle body and deflects the air flow over the wheel.

Retractable deflectors are generally configured to adopt the retracted position at low speeds, for example below a speed limit, for example 50 or 60 km/h (the speed generally adopted in urban areas), and the extended position when the vehicle reaches and exceeds the speed limit.

Retractable deflectors are generally more effective than flexible flaps, which have a smaller size to avoid all contact with any obstacles on the road (stones, branches, debris), but retractable deflectors, with larger dimensions, run close to the road and can be damaged when the car drives over such an obstacle.

During such an event, the deflectors can be deformed, detach from their mounting or break. The proximity to the wheel results in a risk of a further accident in that a splinter or an end of the deformed, detached or broken deflector might damage the wheel and in particular puncture a tire when the vehicle is travelling at high speed.

In order to solve the aforementioned problem at least partially, the invention relates to an aerodynamic deflector device for a motor vehicle wheel, comprising:
- a deflecting panel movably mounted relative to a fixed frame between a retracted position in which the deflecting panel is raised and an extended position in which the deflecting panel is lowered relative to the fixed frame,
- an actuator configured to move the deflecting panel between the retracted and extended positions.

According to the invention, the deflector device also comprises an elastically deformable elastic module, arranged so as to move the deflecting panel to the extended position when the deflecting panel is no longer in the extended position.

In other words, said deflector device also comprises an elastic module that is elastically deformable between a less deformed state and a deformed state, and configured so that, in the deformed state of the elastic module, the deflecting panel is at least partially raised, or retracted. In other words, the elastic module is capable of moving the deflecting panel when it passes from one state of deformation to the other.

The deflector device produced makes it possible to avoid damage to the deflecting panel in the event of an impact with an obstacle on the road. The elastic module is capable of absorbing the energy from the impact while returning the deflecting panel to its initial fully-extended position.

Said control module can have one or more of the following features, taken individually or in combination.

The elastic module comprises a helical spring, or a spring leaf, or a fluid cylinder, or an elastic band, or a compressible or extendible body made from an elastic material.

The elastic module is arranged so that it receives power from the deflecting panel and an extending mechanism actuated by the actuator to move the deflecting panel between the retracted and extended positions.

It comprises a bottom plate, a rod and a top plate, and the elastic element is a helical spring deformable in compression or extension.

The elastic module is engaged with a bottom end of a rack of the extending mechanism, and with a rear end of the deflecting panel.

The rack comprises a bent bottom end portion, in which a hole is made, with a shape and dimensions corresponding to a rod of the elastic module.

The elastic module is arranged so that it receives power from a mobile frame holding a mechanism for extending the deflecting panel.

It comprises a transverse shaft about which the deflecting panel is rotated, forming a hinge between the mobile frame and a fixed frame, and the elastic module is arranged around the transverse shaft and engages with the mobile frame and with the fixed frame.

The elastic module comprises a helical spring deformable in torsion and in the torsion spring surrounds the transverse shaft, and said helical spring comprises two ends, engaging with the fixed frame and the mobile frame respectively.

It comprises several elastic modules deformable in vertical translation and arranged on the edges of the mobile frame.

The deflecting panel is rotatably mobile about a shaft surrounding a fixed spindle, comprising an elastic return element configured to exert a restoring torque the deflecting panel, and the elastic module comprises an elastic torsion element, connected to an actuating pinion moved by a motor and to the deflecting panel, so as to exert torque against the restoring torque that increases with the rotation of the actuating pinion.

The force necessary to place the elastic module in the deformed state is less than 70% of a minimum force resulting in the irreversible deformation or breakage of the deflecting panel.

Further features and advantages of the invention will become apparent on reading the following description, given as a non-limitative illustration and with reference to the attached drawings, in which:

In all of the figures, the same reference signs denote the same elements.

The embodiments described with reference to the figures are examples. Although the description refers to one or more embodiments, this does not necessarily mean that each reference relates to the same embodiment, or that the features only apply to a single embodiment. Single features of different embodiments can also be combined to provide other embodiments.

Figure 1:
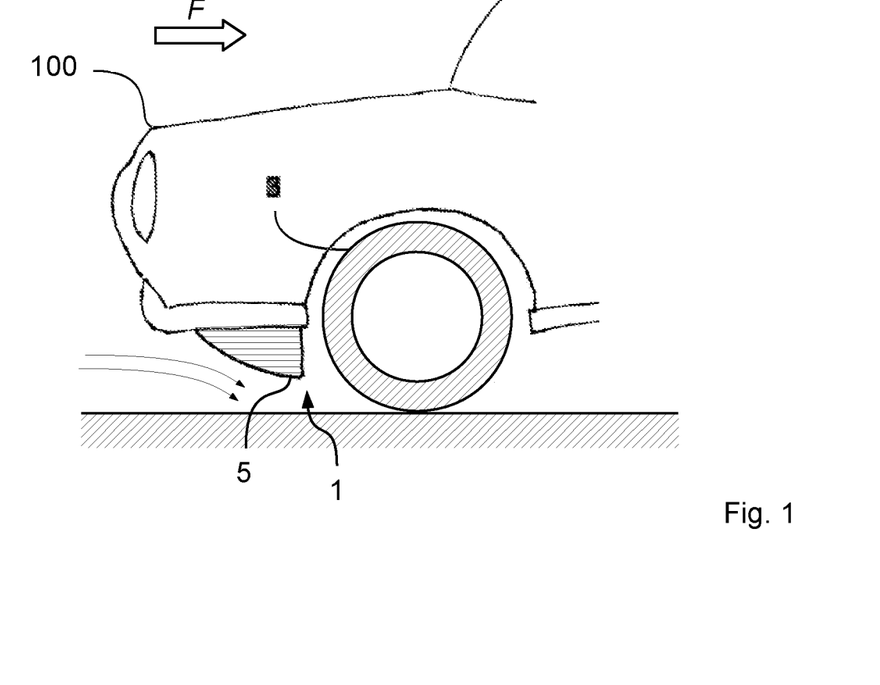
FIG. 1 is a schematic side view of a vehicle with an aerodynamic deflector device.

FIG. 1 is a schematic view of a vehicle 100 with an aerodynamic deflector device 1 according to the invention. The vehicle 100 is shown partially and from the side, centered on the front portion thereof, level with one of the front wheels 3.

The vehicle 100 shown in FIG. 1 is travelling from right to left, the air, which is considered stationary in the terrestrial reference frame, is therefore flowing from left to right in FIG. 1. The orientation of the air flow F makes it possible to define a "downstream" and an "upstream" in the direction of travel of the air flow and in the opposite direction respectively. Terms such as "before", "after", "in front of", "behind" are defined using the course and direction of travel of the car 100 as orientation.

Terms used hereinafter such as "top", "bottom", "above", "below" are defined using the local vertical, defined with the vehicle in normal conditions of travel over flat ground, oriented by gravity.

The transverse direction is given by the axis of rotation of the wheels 3, in a straight line.

The aerodynamic deflector device 1 is arranged upstream of the wheel 3, under the body at the front of the car 100. The aerodynamic device 1 is configured to switch between a retracted position and an extended position. In FIG. 1, the aerodynamic deflector device 1, a deflecting panel 5 of which can be seen, is shown in the extended position.

Figure 2:
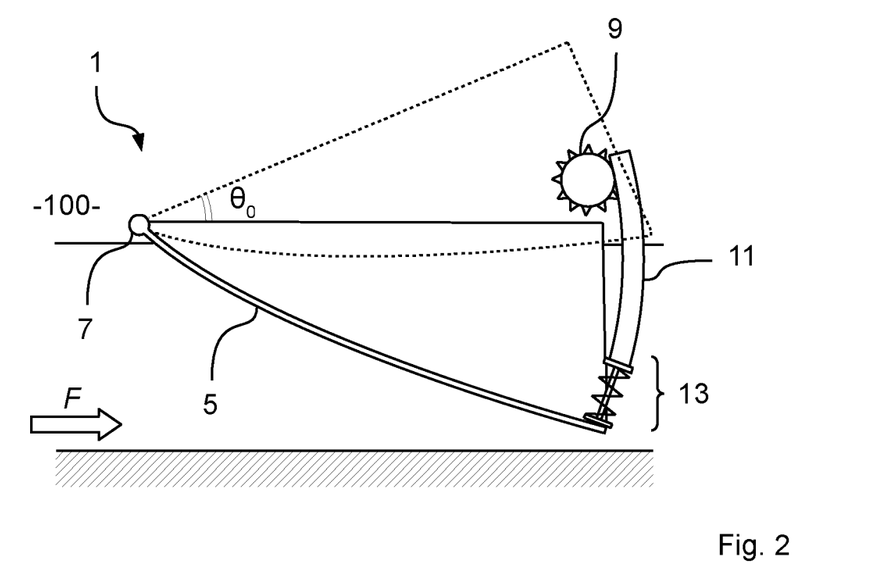
FIG. 2 is a schematic cross-sectional side view of the deflector device in FIG. 1.

The aerodynamic deflector device 1 is shown in greater detail in FIG. 2.

In FIG. 2, the aerodynamic deflector device 1 shown comprises a deflecting panel 5, which can be moved about a shaft 7, a pinion 9 engaging with a rack 11 for moving the deflecting panel 5, and an elastic module 13.

The deflecting panel 5 is rotatably mobile about the shaft 7 between an extended position (shown in solid lines) and a retracted position (shown in dotted lines). In the extended position, the deflecting panel 5 is lowered and the majority thereof extends beyond the body of the vehicle 100. In the retracted position, the deflecting panel 5 is raised in a recess in the body of the vehicle 100 in which it is at least partially retracted. The deflector device also comprises a fixed frame 39 acting as a mounting, illustrated in FIG. 9, with the deflecting panel 5 being mobile according to a retracted or extended position relative to this fixed frame 39.

The position of the deflecting panel 5 is identified by the angle of rotation θ between the retracted position (θ=0) and the adopted position. In particular, when the deflecting panel 5 is in the extended position the angle of rotation θ has a maximum value of $θ_0$.

The deflecting panel 5 has a sloped or semi-arch aerodynamic profile from the shaft 7, to a trailing edge located at the rear and downstream, towards the wheel 3 of the vehicle 100. The deflecting panel 5 is made from a hard, light, impact-resistant material, for example molded plastic, particularly injection-molded. The plastic used can have additional fibers, for example glass or carbon fibers.

The deflecting panel 5 has a U-shaped cross-section, the vertical arms of which shorten as they approach the shaft 7 and the width of which at the trailing edge corresponds to the width of the wheel 3 to be covered.

The deflecting panel 5 is moved between the extended and retracted positions by rotating the pinion 9 by means of an actuator, in particular electric, for example by means of an electric motor, controlled by a control unit of the vehicle 100. Such a control unit generally comprises an electronic memory and calculation means, which are either dedicated or distributed in the electronic network of the vehicle 100. The control unit is configured to control one or more functions of the vehicle 100, in particular by means of electronic switches such as transistors.

In the extended position, the deflecting panel 5 is lowered, and is located outside the recess situated in the body of the vehicle 100, and is located on the path of the air flow F entering, in the absence of a deflecting panel 5, the wheel arch 3 in FIG. 1. When it enters the wheel arch, the air generates turbulence that increases the drag.

The pinion 9 engages with the rack 11, which is translated vertically downwards or upwards depending on the direction of rotation of the pinion 9. The rack 11 is curved, in particular with a radius of curvature corresponding to the length of the deflecting panel 5, between the shaft 7 and its rear end, at which it is connected to the rack 11. Here, the rack 11 has in particular a rectangular cross-section, with the long sides in the longitudinal direction of the vehicle 100 and ridges arranged on its front face.

Other embodiments can be obtained by placing the ridges (and the pinion 9) either on the rear face or on one side of the rack 11.

The bottom end of the rack 11 is connected to an elastic module 13. The other end of the elastic module 13 is connected to the rear end (on the trailing edge) of the deflecting panel 5. The elastic module 13 is elastically deformable between two states: a less deformed state, adopted in the absence of external action, and a deformed state, adopted when an obstacle exerts a force, in particular a vertical force, on the deflecting panel 5.

Here, "less deformed state" is given to mean a state adopted in normal operation in which the elastic deformation energy is minimal. In particular, in the presence of mechanical stops, the less deformed state can be different from the idle configuration of the elastic element in question.

Figure 3:
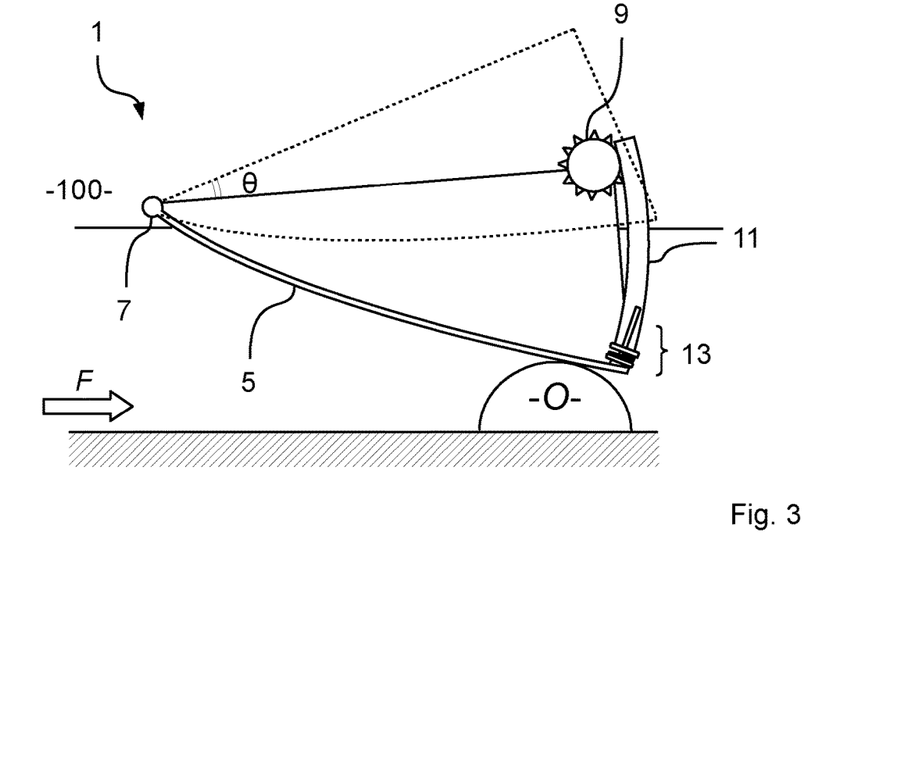
FIG. 3 shows the device in FIGS. 1 and 2 during an impact with an obstacle.

The event of an impact with an obstacle O is shown in FIG. 3. In FIG. 3, the obstacle O has a height greater than the vertical space between the ground and bottom edge of the deflecting surface 5. As a result, when the vehicle 100 drives over said obstacle O, the obstacle O exerts a force normal to the deflecting surface 5 at the point of contact. In particular, the force exerted by the obstacle O comprises a significant upwards vertical component.

The obstacle O can for example be a branch that has fallen from a tree onto the carriageway, a stone that has rolled from a verge, an object abandoned from a vehicle travelling ahead. Obstacles O strike the deflecting panel 5 at a speed close to or equal to the speed of the vehicle. As described above, the deflecting panel 5 is only lowered when the speed is sufficiently high, in particular above the usual speeds in an urban area (approximately 50 to 60 km/h).

Particular embodiments provide for the deflecting panel 5 to extend above a speed of 60 km/h, i.e. a speed higher than the legal speed limit in an urban area (50 km/h). The deflecting panel 5 is retracted when the speed of the vehicle falls back below 40 km/h, a speed slightly above the usual speed at which fixed, marked obstacles such as speed bumps are usually travelled over. The difference between the extension speed and the retraction speed makes it possible, by hysteresis, to avoid the repeated and unwanted actuation of the mechanism for extending the deflecting panel 5 when the speed is oscillating around the extension speed.

An impact between an obstacle O and the deflecting panel 5 generates forces, torques and vibrations that can, in the absence of an elastic module 13, lead to the deformation or breakage of the deflecting panel 5.

In FIG. 3, the obstacle O pushes the deflecting panel 5 upwards, which places the elastic module 13 in the deformed state. In the deformed state, the elastic module 13 is compressed here, the position angle θ of the deflecting panel 5 is then less than $\theta_0$, the deflecting panel 5 is at least partially raised, so as to move away and let the obstacle O past.

Figure 4A:
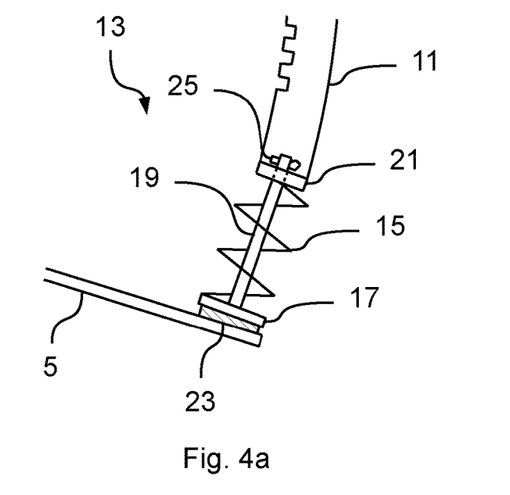
FIGS. 4*a*, 4*b* show the elastic module of the device in FIGS. 1 to 3 in greater detail.

FIG. 4a shows further details of an embodiment of an elastic module 13 that can be used in the examples in FIGS. 1, 2 and 3.

In FIG. 4a, the elastic module 13 is shown engaged with the rear portion of the deflecting panel 5 and with the bottom end of the rack 11. The elastic module 13 essentially comprises an elastic element 15, a bottom plate 17, a rod 19 and a top plate 21.

The bottom plate 17 is rigidly connected to the rear portion of the deflecting panel 5. Said bottom plate 17 comprises a flat metal part that is glued, screwed or riveted to the rear portion of the deflecting panel 5. In the example in FIG. 4a, a rubber or flexible plastic pad 23 is implemented between the bottom plate 17 and the deflecting panel 5. This pad 23 makes it possible to absorb some of the small-amplitude vibrations generated by the discontinuity of the streamlines at the trailing edge of the deflecting panel 5. These vibrations can in the long term be detrimental to the gluing of the bottom plate 17, if applicable, in the absence of an absorbent element.

The rod 19 extends from the bottom plate 17, upwards along the normal to the bottom plate 17. The rod 19 and the bottom plate 17 can consist of a single piece and be produced in a single common machining step, for example by molding turning or milling.

The top end of the rod 19 engages with the top plate 21, through which it partially passes vertically. The top plate 21 is flat, metal, and has a hole drilled in its center (see FIG. 4b).

A pin 25 is inserted transversely in the rod 19, at its top end, above the top plate 21. The pin 25 prevents the rod 19 from disconnecting from the top plate 21 by retaining a portion of the rod 19 above the top plate 21. The pin 25 can be a beta, split, ring or simply cylindrical type pin.

The elastic element 15, here a helical compression spring, surrounds the rod 19. When the elastic module 13 is deformed by a stress, the rod 19 is pushed into the hole in the top plate 21, and the elastic element 13 is compressed between the bottom plate 17 and the top plate 19, which move closer together.

The elastic element 15 is selected so that the stress required to compress the elastic module 13 is greater than the stress generated by the air pressure in the range of speeds expected during normal travel (50 to 130 km/h) on the surface of the deflecting panel 5, but less than the deformation or breaking stress of the deflecting panel 5. In particular, the deformation stress of the elastic module 13 is lower than a predetermined fraction of the theoretical value of the minimum stresses, in particular forces, resulting in the irreversible deformation or breakage of the deflecting panel 5, for example 70% of this value.

Alternative embodiments can replace the helical spring of the elastic element 15 with a spring leaf, an elastic band, a fluid cylinder, or a compressible or extendible body made from an elastic material.

Figure 4B:
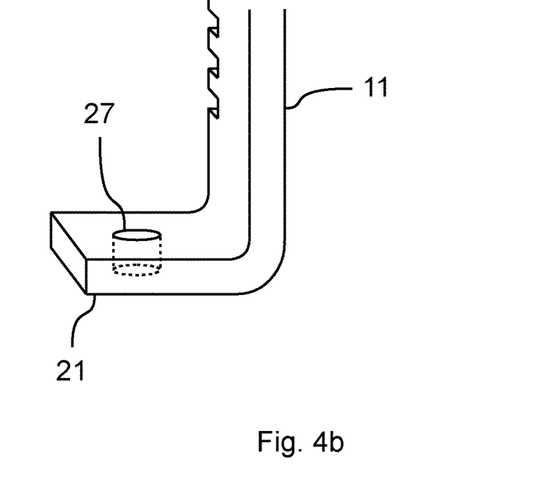

FIG. 4b shows a particular embodiment of the top plate 21. FIG. 4b is a schematic view of the bottom end of the rack 11 of the aerodynamic deflector device 1.

Here, the top plate 21 is a bent end portion of the rack 11, in which a hole 27 is made, with a shape and dimensions corresponding to the rod 19. The top plate 21 is thus obtained simply by drilling then transversely bending the bottom end portion of the rack 11. As a result, no separate parts or additional fastenings are required.

Figure 5:
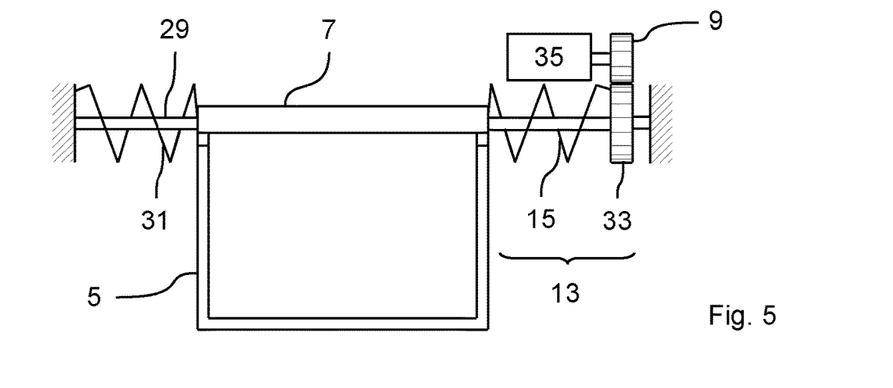
FIG. 5 is a schematic rear view of an alternative embodiment of an aerodynamic deflector device according to the invention.

FIG. 5 is a schematic view of an alternative embodiment of an elastic module 13 for other embodiments of the invention. In FIG. 5, the aerodynamic deflector device 1 is seen from the rear, from the position of the wheel 3. The deflecting panel 5 is thus seen from its trailing edge, looking in a longitudinal direction towards the shaft 7. Here, the shaft 7 of the deflecting panel 5 surrounds a fixed spindle 29. The fixed spindle 29 is in particular made from metal, and connected at its ends to a frame rigidly connected to the vehicle 100.

The aerodynamic deflector device 1 comprises an elastic return element, here a return spring 31. The return spring 31 is a helical torsion spring surrounding an end portion of the fixed spindle 29. It is connected to the frame rigidly connected to the vehicle 100 and to the deflecting panel 5. The return spring 31 is configured to return the deflecting panel 5 to the retracted position in the absence of other stresses by returning to a less deformed configuration.

The elastic module 13 that also contributes to the extension of the deflecting panel 5 is arranged at the other end of the fixed spindle 29. Here, the elastic module 13 comprises an actuating pinion 33 forming with the pinion 9 a gear moved by the actuation of a motor 35, in particular by means of a control unit (not shown).

The actuating pinion 33 is engaged with one end of the spring forming the elastic element 15. Here, the elastic element 15 is a helical torsion spring. The other end of the elastic element 15 is engaged with the deflecting panel 5.

When the motor 35 is powered, it moves the pinion 9, which in turn rotates the actuating pinion 33. The rotation of the actuating pinion 33 deforms the elastic element 15, which then exerts increasing torque on the deflecting panel 5 in the direction driving it towards the extended position $\theta=\theta_0$.

The increasing torque exerted on the deflecting panel 5 opposes the restoring torque exerted by the return spring 31, which drives and initially holds the deflecting panel in the retracted position $\theta=0$. When the increasing torque reaches and then exceeds the value of the restoring torque, the deflecting panel 5 is gradually placed in the extended position $\theta=\theta_0$. The return spring 31 is then gradually deformed and exerts a restoring torque that increases with the rotation of the deflecting panel 5.

In the extended state $\theta=\theta_0$ of the deflecting panel 5, the position is held by an equilibrium between the restoring torque and the increasing torque. The position adopted in this case is an elastic equilibrium position. An impact with an obstacle O moving the deflecting panel 5 away from said equilibrium position results in an imbalance between the restoring torque and the increasing torque in the direction returning the deflecting panel 5 to the equilibrium position $\theta=\theta_0$.

The presence of the elastic module 13 reduces the risks of damage to the aerodynamic deflector device 1 on impact with an obstacle O. This makes it possible to lengthen the expected service life of the product, and reduces the risks when travelling in the vehicle 100.

Figure 6:
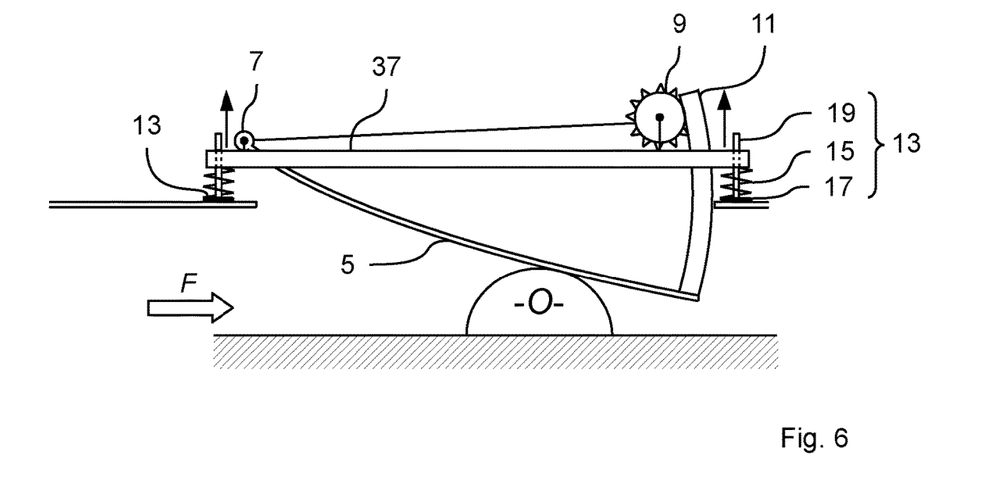
FIG. 6 is a schematic cross-sectional side view of an alternative embodiment of an aerodynamic deflector device according to the invention.

FIG. 6 shows a more general example of an elastic module 13, suitable for various mechanisms of aerodynamic deflector devices 1. In the particular embodiment in FIG. 6, the deflector device 1 comprises a pinion 9 and a rack 11 similar to the embodiments in FIGS. 2 and 3.

The embodiment of an aerodynamic device 1 in FIG. 6 comprises in particular a mobile frame 37. The mobile frame 37 is rectangular, open at its center. The mobile frame 37 forms a mounting for the elements of the aerodynamic deflector device 1. The shaft 7 is in particular connected to and hinged on the mobile frame 37. The pinion 9 is also rigidly connected to the mobile frame 37, relative to which the motor rotates it.

Such mobile frames 37 are used as a mounting to obtain a modular aerodynamic deflector device 1, which can be assembled and transported easily as a unit between the different assembly workshops of the vehicle 100.

The frame 37 is intended for covering the edge of an opening in the body or the rocker panel of the vehicle 100, upstream of the wheel arch 3 of the vehicle 100. The frame 37 rests on elastic modules 13, located at each corner of the frame 37. Here, the elastic modules 13 are deformable by vertical translation of the frame 37, and therefore of the aerodynamic deflector device 1 attached to the frame 37.

Other embodiments are obtained using a different number of elastic modules 13, for example three, one in the middle of one side of the mobile frame 37, and two others at the ends of the opposite side (triangular mounting).

The elastic modules 13 are in the less deformed state when they are compressed, which holds the frame 37 and the aerodynamic deflector device 1 in the bottom position, corresponding to the extended state of the deflecting panel 5.

Another directly derived embodiment provides for the use of extension springs, arranged under the mobile frame 37.

The elastic modules 13 each comprise a rod 19, which in this embodiment surrounds an elastic element 15, here a helical spring deformable in extension, arranged between the mobile frame 37 and a bottom plate 17 of the elastic modules 13. The rod 19 passes through a hole in the mobile frame 37 and guides the mobile frame 37 in vertical translation.

When the deflecting panel 5 comes into contact with the obstacle O, the forces exerted on the deflecting panel 5 translate the entire aerodynamic deflector module 1 upwards by raising the mobile frame 37, which extends the elastic modules 13. Once the obstacle O has passed, the elastic modules 13 exert a restoring force on the mobile frame 37, which returns it to the bottom position of maximum extension of the deflecting panel 5.

Figure 7:
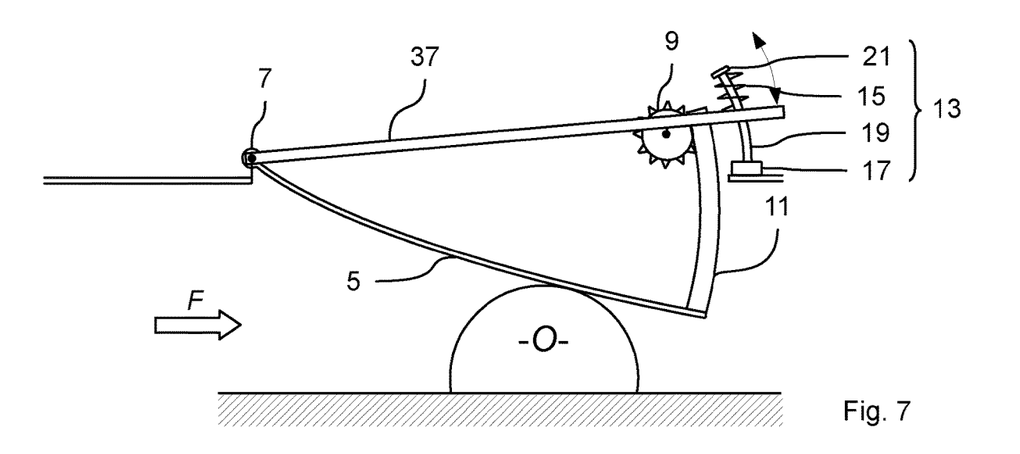
FIG. 7 is an exploded schematic cross-sectional side view of another alternative embodiment of an aerodynamic deflector device according to the invention.

In FIG. 7, the aerodynamic deflector module 1, produced according to a different embodiment, again comprises a mobile frame 37, here rotatably mobile about the shaft 7 of the deflecting panel 5.

Here, the front end of the mobile frame 37 engages with the shaft 7 and the rear end thereof engages with at least one elastic module 13, preferably two, one at each transverse end of the rear side of the mobile frame 37.

The elastic module 13 visible in FIG. 7 comprises a curved rod 19, which guides the rotation of the mobile frame 37 in rotation. Here, the elastic element 13 is a helical spring deformable in compression, surrounding the rod 19, arranged between the mobile frame 37 and the top plate of the elastic module 13.

The bottom plate 17 of the elastic module 13 on which the mobile frame 37 rests in the absence of an obstacle O forms a stop and can comprise a disc of vibration-absorbing material, for example a rubber or soft plastic pad.

Figure 8:
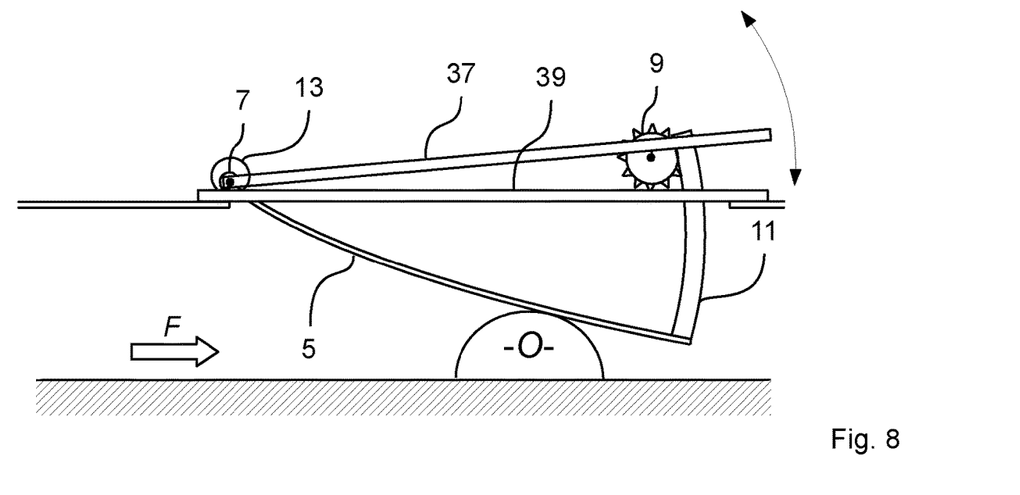
FIGS. 8 and 9 are schematic cross-sectional side views of yet another embodiment of an aerodynamic deflector device with a fixed frame and a mobile frame.
Figure 9:
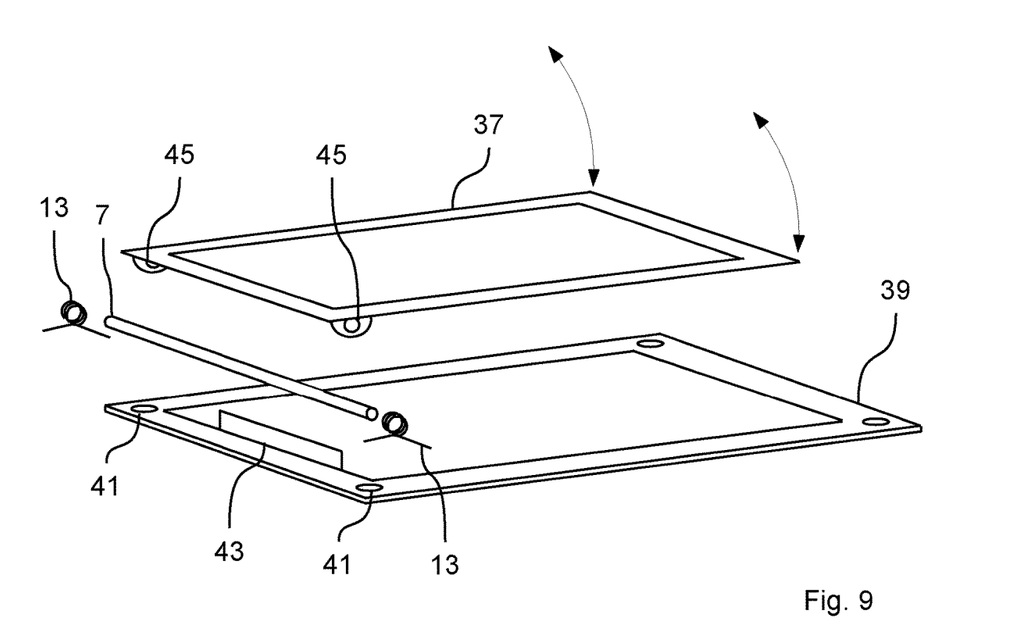

FIGS. 8 and 9 show another embodiment of the aerodynamic deflector module 1 that also comprises a fixed frame 39. The fixed frame 39 is rectangular, with a rectangular opening at its center (see FIG. 9). It comprises holes 41 in its corners, which are used to attach the fixed frame 39 to a floor of the vehicle 100 by screwing or riveting.

The fixed frame 39 also comprises a joint 43 that interacts with the shaft 7. The shaft 7 is surrounded by helical springs deformable in torsion forming the elastic modules 13. The helical springs 13 each comprise two ends, rigidly connected to the mobile frame 37 and the fixed frame 39 respectively.

The shaft 7 also engages with the mobile frame 37 via hinges 45, so that the mobile frame 37 is rotatably mobile about the shaft 7. The helical springs 13 are in their less compressed state when the mobile frame 37 is arranged parallel to the fixed frame 39. Again, the mobile frame 37 holds the components of the aerodynamic deflector module 1 such as the pinion 9, the rack 11 and the deflecting panel 5.

When the deflecting panel 5 meets an obstacle O (FIG. 8), said obstacle O exerts an upwards vertical force that drives the deflecting panel 5 upwards. The deflecting panel 5 moves away by rotating the mobile frame 37, the rear end thereof being driven upwards. When the obstacle O has passed, the helical springs 13 exert a torque on the mobile frame 37 that returns it to the lowered position, parallel to the fixed frame 39.

Such aerodynamic deflector modules 1 with a fixed frame 39 and a mobile frame 37 holding the deflecting panel 5 and its actuating mechanism 9, 11 can be produced with different actuating mechanisms 9, 11, for example with a longitudinal shaft and a deflecting panel 5 that is rotatably mobile about this shaft.

The invention makes it possible to obtain aerodynamic deflector modules 1 the deflecting panel 5 of which moves away on impact with an obstacle O before the deformation or breakage of said deflecting panel 5.

The invention claimed is:

1. An aerodynamic deflector device for a motor vehicle wheel, comprising:
    a deflecting panel movably mounted relative to a fixed frame between a retracted position in which the deflecting panel is raised and an extended position in which the deflecting panel is lowered relative to the fixed frame; and
    an elastically deformable elastic module, arranged so as to move the deflecting panel to the extended position when the deflecting panel is no longer in the extended position,
    wherein the elastic module is arranged so that the elastic module receives power from the deflecting panel and an extending mechanism actuated by an actuator to move the deflecting panel between the retracted and extended positions.

2. The deflector device as claimed in claim 1, wherein the elastic module comprises a helical spring, or a spring leaf, or a fluid cylinder, or an elastic band, or a compressible or extendible body made from an elastic material.

3. The deflector device as claimed in claim 1, further comprising a bottom plate; a rod; and a top plate, wherein the elastic element is a helical spring deformable in compression or extension.

4. The deflector device as claimed in claim 1, wherein the elastic module is engaged with a bottom end of a rack of the extending mechanism, and with a rear end of the deflecting panel.

5. The device as claimed in claim 4, wherein the rack comprises a bent bottom end portion in which a hole is made, with a shape and dimensions corresponding to a rod of the elastic module.

6. An aerodynamic deflector device for a motor vehicle wheel, comprising:
   a deflecting panel movably mounted relative to a fixed frame between a retracted position in which the deflecting panel is raised and an extended position in which the deflecting panel is lowered relative to the fixed frame; and
   an elastically deformable elastic module, arranged so as to move the deflecting panel to the extended position when the deflecting panel is no longer in the extended position, wherein
   the elastic module is arranged so that the elastic module receives power from a mobile frame holding a mechanism for extending the deflecting panel.

7. The deflector device as claimed in claim 6, further comprising a transverse shaft about which the deflecting panel is rotated, forming a hinge between the mobile frame and a fixed frame, and the elastic module is arranged around the transverse shaft and engages with the mobile frame and with the fixed frame.

8. The deflector device as claimed in claim 6, wherein the elastic module comprises a helical spring deformable in torsion and in that the torsion spring surrounds the transverse shaft, and said helical spring comprises two ends, engaging with the fixed frame and the mobile frame respectively.

9. The deflector device as claimed in claim 6, further comprising several elastic modules that are deformable in vertical translation and arranged on the edges of the mobile frame.

10. An aerodynamic deflector device for a motor vehicle wheel, comprising:
    a deflecting panel movably mounted relative to a fixed frame between a retracted position in which the deflecting panel is raised and an extended position in which the deflecting panel is lowered relative to the fixed frame; and
    an elastically deformable elastic module, arranged so as to move the deflecting panel to the extended position when the deflecting panel is no longer in the extended position, wherein
    the deflecting panel is rotatably mobile about a shaft surrounding a fixed spindle, comprising an elastic return element configured to exert a restoring torque the deflecting panel, wherein the elastic module comprises an elastic torsion element, connected to an actuating pinion moved by a motor and to the deflecting panel, so as to exert torque against the restoring torque that increases with the rotation of the actuating pinion.

* * * * *